Feb. 4, 1958  T. R. BECK  2,822,373
PROCESS FOR THE MANUFACTURE OF ORGANIC ISOCYANATES
Filed March 15, 1954
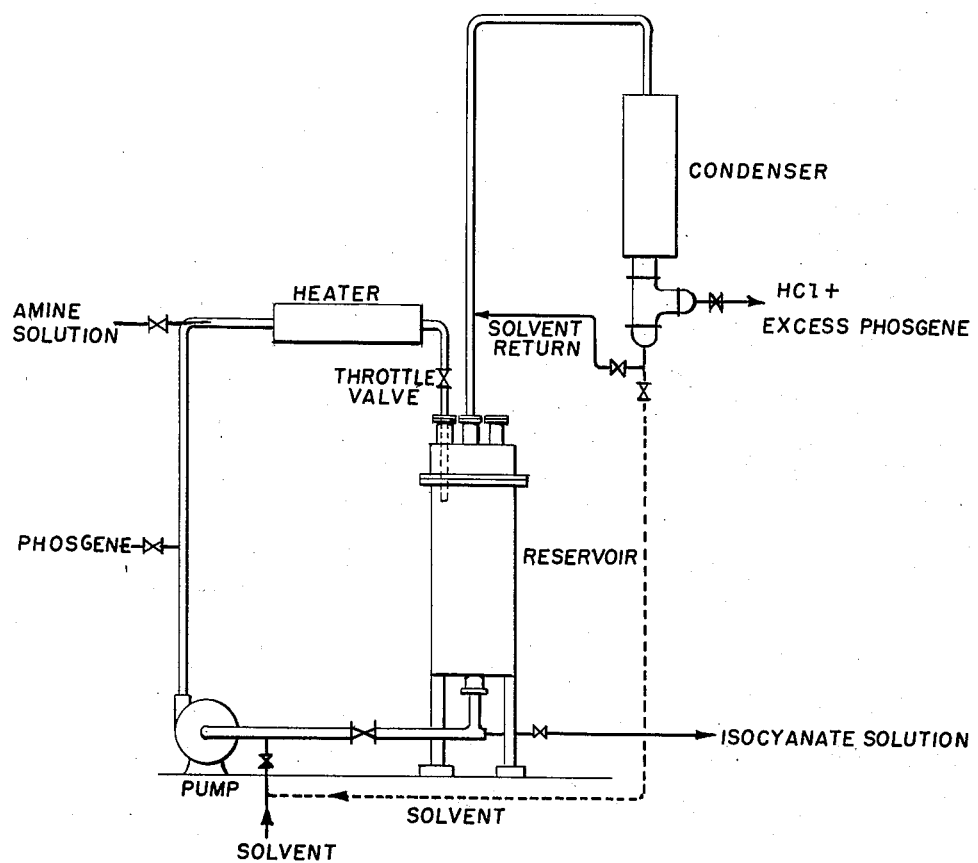
INVENTOR
THEODORE R. BECK
BY *Cullen D. Frey*
ATTORNEY

United States Patent Office 2,822,373
Patented Feb. 4, 1958

2,822,373

PROCESS FOR THE MANUFACTURE OF ORGANIC ISOCYANATES

Theodore R. Beck, Wilmington, Del., assignor to E. I. du Pont de Nemours and Company, Wilmington, Del., a corporation of Delaware Application March 15, 1954, Serial No. 416,199

11 Claims. (Cl. 260—453)

This invention relates to an improved chemical process, and more particularly to a process for the manufacture of organic isocyanates by the reaction of phosgene on amines.

In the formation of organic isocyanates an amine is reacted with phosgene, giving the organic isocyanate together with hydrogen chloride as a by-product. Usually an excess of the phosgene is employed so that the by-product gas is a mixture of hydrogen chloride and phosgene. The prior art discloses various methods for carrying out this process. Usually this process is carried out as a batch process and it was early disclosed that the reaction be carried out in an autoclave under autogenous pressure with subsequent venting of the gases at the end of the reaction and distillation of the organic solvent solution of the isocyanate. In a more recent process it is disclosed that the gases can be vented as the reaction proceeds, although still maintaining relatively high pressures in the autoclave. This latter process allegedly reduced the time of reaction, although in the illustrations disclosed the reaction was carried out for a period of from 45 minutes to two hours.

It is an object of the present invention to provide a continuous process for the manufacture of organic isocyanates in which the reaction is carried out and completed in a very short interval of time but which gives high yields of a product of relatively high purity.

According to the present invention, organic isocyanates may be produced by continuously passing an inert solvent into a reaction zone in a state of turbulent flow at super-atmospheric pressure, introducing phosgene continuously under pressure into the solvent solution and then continuously introducing into such solvent solution of the phosgene the organic amine which is to be converted to the isocyanate, exhausting the reaction solution into a zone of lower pressure whereby the hydrogen chloride and excess phosgene are removed as gases, and isolating the isocyanate from the resulting organic solvent by distillation. When desired, the organic solution of the isocyanate may be recycled through the reaction zone with the introduction of fresh solvent and the introduction of more phosgene and amine to be reacted. When the desired concentration of isocyanate and organic solvent is obtained, part of the solution is continually removed while fresh solvent is added to the system.

In the accompanying drawing which forms a part of the specification, a diagrammatic representation of equipment in which this process may be carried out is illustrated. The reservoir may be a jacketed reservoir in which the solvent is maintained at the desired reaction temperature, or when desired the reservoir may be merely an exhaust vessel into which the reaction solution is expelled and the heat necessary to cause the reaction may be applied through a heater after the introduction of the amine solution into the solvent solution of the phosgene. Any solvent carried over with the hydrogen chloride and excess phosgene gases may be returned to the reservoir, or, alternatively, may be introduced with fresh solvent on the low pressure side of the pump. Where the process is carried out with no recycling of the isocyanate solvent solution, the isocyanate and solvent may be removed directly from the reservoir to suitable still, and in this alternative fresh solvent is introduced into the low pressure side of the pump.

In the apparatus as illustrated, the solvent employed is put under pressure by the pump in the pipe line into which the phosgene is introduced either through a nozzle to break up the gas into small bubbles or by mere introduction of the gas into the line which is flowing at a rate to assure turbulent flow in the tube. The amine solution is then introduced under necessary pressure directly into the solvent solution of the phosgene and, again, at a point where the solution is in turbulent flow as it passes through the space enclosed with the heater. In the system the relationship of the rate of flow and the diameter of the pipe must be such that the solvent is in turbulent flow, that is, where the Reynolds number is at least 10,000. This causes substantially complete solution of the phosgene in the solvent, so that the amine when introduced as a solution in the solvent, is in complete and thorough contact with the phosgene in the solution. The reaction is substantially instantaneous, for it is found, as illustrated in the following examples, that the reaction takes place in the fraction of a second. The solution is then vented through a valve into the reservoir which is maintained at pressure much lower than that in the line and usually at substantially atmospheric pressure so the hydrogen chloride and excess phosgene is flashed from the solution and carried off through a condenser. Any entrained solvent is thus recovered and can be returned to the system as desired.

The pressure in the reaction zone in the pipe line is maintained by a valve or, as hereinafter illustrated, where the pressure used is not high it is merely maintained by the pressure the pump exerts on the solution in the line. The solvent solution of the isocyanate can be recirculated through the pump to produce a higher concentration of isocyanate in the solution. After the desired concentration of isocyanate in the solution is obtained, some of the isocyanate solution is continually removed to a still or storage to maintain a constant level in the reservoir and fresh solvent is added at the low pressure side of the pump. Alternatively, the isocyanate solution may be removed directly to a still or storage and not recirculated, in which case fresh solvent, which may include that which is recovered from the condenser, is introduced into the line.

It has been found that by carrying out the reaction as herein disclosed there is substantially no reaction of the amine with the isocyanate even when the recycling process is employed. The amine appears to react preferentially with the phosgene to form the isocyanate. If the isocyanate content of the recycle stream rises materially above 15%, some reaction of the isocyanate with the amine may take place to cause some decrease in the yield of the desired isocyanate. In such case the recycle stream may be diluted by the addition of fresh solvent. The solvent flashed from the product stream along with the dissolved phosgene and hydrogen chloride may be returned directly to the system without purification.

One of the advantages of the present process is that, due to the increased solubility of phosgene in the solvent under pressure, less solvent needs to be circulated through the pipe line reactor for any given quantity of amine and phosgene fed. Under the conditions of this invention the hydrogen chloride is stripped off from the solvent solution of the isocyanate at a pressure substantially lower than that in which the reaction takes place. This facilitates the removal of the hydrogen chloride. By adding phosgene under pressure the higher ratio of phosgene to hydrogen chloride can be maintained, which materially favors the formation of the isocyanate directly without going through the amine hydrochloride formation. It is believed that this favors the improved yields which are obtained.

The isocyanate is recovered by distilling off the solvent, which solvent can again be recirculated in the system. The isocyanate can then be redistilled, if desired. Both distillations are preferably carried out under reduced pressure.

Pressures of from 5 to 20 pounds per square inch gauge have been found to be satisfactory for carrying out the process of this invention, although higher pressures even up to 200 pounds may be employed if desired. A centrifugal pump or positive displacement pump may be used.

It is essential that the phosgene be introduced into the solvent stream so that it is dispersed or completely dissolved therein before the introduction of the amine solution. The molar ratio of the phosgene to amine should be such that there is at least 25% stoichiometrical excess of the phosgene, that is, one should employ at least 1.25 mols of phosgene per $NH_2$ group. Usually a much greater excess of phosgene is employed and the preferred range would be between about 70% and 110% excess of phosgene. In general it is unnecessary to use an excess above 110%.

The temperature at which the reaction is carried out should be above the decomposition temperature of the intermediate carbamyl chloride formed by the reaction of phosgene with the amine. This temperature will range from 90° to 180° C., depending upon the particular amine employed. While higher temperatures may be employed, they are not required. The flashing off of the hydrogen chloride as the reaction stream passes into the reservoir maintained at lower pressure permits its ready removal from the solution at these temperatures.

The concentration of the organic amine in the solvent should be between about 5% and 30% by weight. Below this range the amount of solvent required is unnecessarily large, and when operating materially above this range of concentration the yields may be decreased by the formation of tarry by-products.

The solvents employed in this process are preferably the chlorinated aromatic hydrocarbon solvents in which the phosgene is relatively soluble under the pressures employed. It is preferred that the solvent have a lower boiling point than the particular isocyanate which is being prepared in order that the isocyanate will remain dissolved in the solution but can be readily removed therefrom by distillation of the solvent. The monochlorobenzene, o-dichlorobenzene, p-dichlorobenzene, the trichlorobenzenes, the corresponding toluenes and xylenes, chloroethylbenzene, monochlorodiphenyl and the alpha- and beta-naphthyl chloride are illustrative of the types which may be used. Because of its particular boiling point, the o-dichlorobenzene is a preferred solvent. Any other inert organic solvent, in which the phosgene and the amine are relatively soluble under the pressures used, may be employed.

The process of this invention is applicable to the manufacture of isocyanates in general which can normally be prepared by the reaction of amines with phosgene, either mono-, di- or polyisocyanates from the corresponding mono-, di- and polyamines. The process is particularly applicable to the reaction of aromatic amines with phosgene, such as aniline, toluidine, benzidine, naphthyl amines, 2,4-tolylene diamine, 2,6-tolylene diamine, the phenylene diamines, 4,4'-diamino diphenyl methane, 1,5-naphthalene diamine, 1-amino-3-(4-aminophenyl) propane, anisidine, chloroanilines, etc.

The following examples are given to more fully illustrate the invention, in which the yields given are based on the weight of the amine employed. In the specification and claims, parts or percentages used are by weight unless otherwise specified.

*Example 1*

The equipment used is arranged as in the accompanying drawing. Ortho-dichlorobenzene is used as the solvent and m-tolylene diamine is used for the preparation of 2,4-tolylene diisocyanate. The process is started with 55 parts of o-dichlorobenzene in the reservoir vessel. This is pumped through the pipe line reactor where phosgene is first introduced and then an 8% (by weight) solution of m-tolylene diamine in o-dichlorobenzene is introduced. The solution is then returned to the reservoir vessel through a valve which is adjusted to give the pressure desired.

In this equipment the reservoir is a 10 gallon jacketed enamel kettle. Heat is supplied to the jacket by a hot oil system. The pump used is a stainless steel centrifugal pump. The phosgene inlet consists of a ½ inch pipe brought into the recycle reaction line at a T. The recycle reaction line is 1 inch diameter schedule 40 stainless steel pipe. The linear distance from the phosgene inlet to the diamine solution inlet is approximately 4 feet. The diamine solution inlet is at a 1 inch T at a right angle bend in the line. The pressure relieving device is a 1 inch valve placed 8 inches downstream from the amine solution inlet. The flow and conditions of the process are as given below:

| | Quantity |
|---|---|
| Initial charge in reservoir, o-dichlorobenzene__lbs__ | 55 |
| m-Tolylene diamine in feed _____percent__ | 8 |
| Temperature of m-tolylene diamine feed soln__° C__ | 110 |
| Rate of addition of m-tolylene diamine____lbs./hr__ | 3.15 |
| Rate of addition of phosgene_____lbs./hr__ | 10.0 |
| Rate of recycle feed through pump____gals./min__ | 8 |
| Velocity in reaction zone, linear_____ft./sec__ | 3 |
| Temperature in reaction zone_____° C__ | 165 |
| Temperature in reservoir kettle_____° C__ | 165 |
| Pressure in reservoir kettle _____Atmospheric |
| Pressure in reaction line_____p. s. i. gauge__ | 8 |
| Excess phosgene employed (above theory) percent__ | 96 |
| Time of run _____hours__ | 3 |
| Yield of 2,4-tolylene diisocyanate_____percent__ | 90.5 |

When methylene bis(4-phenylamine) is substituted for m-tolylene diamine in molar equivalent amount, methylene bis(4-phenyl isocyanate) is obtained in similar yield.

Benzidine similarly gives 4,4'-diphenyl diisocyanate in equivalent yield.

*Example 2*

This process is carried out in the same equipment used for Example 1, and the procedure is the same.

| | Quantity |
|---|---|
| Initial charge in reservoir, o-dichlorobenzene__lbs__ | 55 |
| m-Tolylene diamine in feed _____percent__ | 16 |
| Rate of addition of m-tolylene diamine___lbs./hr__ | 4.7 |
| Temperature of m-tolylene diamine feed ____° C__ | 110 |
| Rate of addition of phosgene _____lbs./hr__ | 16 |
| Rate of recycle feed through pump_____gals./min__ | 8 |
| Velocity in reaction zone, linear _____ft./sec__ | 3 |
| Excess phosgene employed (above theory)_percent__ | 110 |
| Temperature in reaction zone_____° C__ | 165 |
| Temperature in reservoir kettle _____° C__ | 165 |
| Pressure on reservoir kettle_____Atmospheric |
| Pressure in recycle line _____p. s. i. gauge__ | 8 |
| Time of run _____hours__ | 4 |
| Yield of 2,4-tolylene diisocyanate _____percent__ | 86.5 |

This example illustrates the use of increased concentration of m-tolylene diamine in o-dichlorobenzene and increased phosgene feed.

*Example 3*

In this example the equipment and procedure of Example 1 are used. The temperature of reaction is lower and the rates of feed of m-tolylene diamine solution in o-dichlorobenzene and the phosgene feed are slower.

| | Quantity |
|---|---|
| Initial charge in reservoir, o-dichlorobenzene___lbs__ | 55 |
| m-Tolylene diamine in feed_____percent__ | 8 |
| Rate of addition of m-tolylene diamine_____lbs./hr__ | 2.85 |
| Temperature of m-tolylene diamine feed_____° C__ | 110 |
| Rate of addition of phosgene_____lbs./hr__ | 9.5 |
| Rate of recycle feed through pump_____gals./min__ | 8 |
| Velocity in reaction zone, linear_____ft./sec__ | 3 |
| Excess of phosgene employed (above theory) percent__ | 106 |
| Temperature in reaction zone_____° C__ | 140 |
| Temperature in reservoir_____° C__ | 140 |
| Pressure on reservoir kettle_____ Atmospheric | |
| Pressure in recycle line_____p. s. i. g__ | 8 |
| Time of run_____hours__ | 4 |
| Yield of 2,4-tolylene diisocyanate_____percent__ | 92 |

When the same process is run with a reaction zone temperature of 110° C. and a reservoir temperature of 110° C., a yield of 90.5% is obtained.

Where benzidine is substituted in the above process in place of the m-tolylene diamine, using a 12% solution in orthodichlorobenzene with a phosgene feed of 12 pounds per hour equivalent to an excess of 100% over theory, and the temperature in both the reaction zone and the reservoir is maintained at 175° C. under a pressure in the reaction zone of 10 pounds per square inch, a high yield of 4,4'-diphenylene diisocyanate is obtained.

*Example 4*

Instead of the m-tolylene diamine of Example 3, methylene bis(4-phenylamine) is converted to the isocyanate under the following conditions:

| | Quantity |
|---|---|
| Initial charge in reservoir, o-dichlorobenzene___lbs__ | 55 |
| Concentration of amine in o-dichlorobenzene feed solution_____percent__ | 12 |
| Rate of addition of the amine_____lbs./hr__ | 3 |
| Temperature of amine feed solution_____° C__ | 110 |
| Rate of addition of phosgene_____lbs./hr__ | 6 |
| Rate of recycle feed through pump_____gals./min__ | 20 |
| Velocity in reaction zone_____ft./sec__ | 7.5 |
| Excess of phosgene employed (over theory)___percent__ | 100 |
| Temperature in reaction zone_____° C__ | 175 |
| Temperature in reservoir_____° C__ | 175 |
| Pressure in reaction zone_____p. s. i. g__ | 1 |
| Pressure in reservoir kettle_____ Atmospheric | |
| Time of run_____hours__ | 5 |
| Yield of methylene bis(4-phenyl isocyanate) percent__ | 95 |

The throttle valve is not used in this run.

*Example 5*

In this example, the apparatus employed in the first four examples is modified by substituting a 4 inch diameter glass cylinder 4 feet long which serves as the reservoir in place of the 10 gallon kettle. This reduces the total liquid holdup in the system to about 3 gallons. A tubular steel heat exchanger for heating is inserted in the reaction line between the amine feed inlet and the throttle valve. It has 5 square feet of heating surface. The linear pipe line distance from the amine feed line to the throttle valve is now about 6 feet. An inlet is placed in the recycle line ahead of the pump so additional solvent may be introduced.

This method of preparation differs from the previous examples in that an extra quantity of o-dichlorobenzene is introduced into the recycled solution stream ahead of the recycle pump to decrease the concentration of the recycled 2,4-tolylene diisocyanate. The quantity introduced in this example is sufficient to reduce the diisocyanate concentration to 10% which is the equivalent to that obtained with an 8% m-tolylene diamine feed. This dilution permits the use of a 16% m-tolylene diamine feed without loss of yield due to formation of tars. The conditions are as follows:

| | Quantity |
|---|---|
| Concentration of m-tolylene diamine in feed solution_____percent__ | 16 |
| Rate of addition of diamine_____lbs./hr__ | 3 |
| Temperature of diamine feed solution_____° C__ | 110 |
| Rate of addition of phosgene_____lbs./hr__ | 110 |
| Excess phosgene feed (over theory)_____percent__ | 100 |
| Rate of recycle feed through pump_____gal./min__ | 8 |
| Rate of o-dichlorobenzene feed to recycle___lbs./hr__ | 22 |
| Temperature in reaction zone_____° C__ | 155 |
| Pressure in reaction zone_____lbs./sq. in__ | 7 |
| Pressure in reservoir_____ Atmospheric | |
| Time of run_____hours__ | 3 |
| Yield of 2,4-tolylene diisocyanate on diamine fed percent__ | 93 |

*Example 6*

The revised equipment of Example 5 is used with an additional change in the amine dispersing section. Instead of introducing the amine solution at a T into a 1 inch pipe which gives a lineal velocity of 3 feet per second at a pump recycle of 8 gallons per minute, the amine solution is introduced through a nozzle which is inserted at a 45° angle into a ⅜ inch inside diameter pipe through which the flow is at a lineal velocity of 20 feet per second at a pump recycle of 8 gallons per minute. This greatly increases the Reynolds number of the turbulent flow at this point.

The conditions of the run are as follows:

| | Quantity |
|---|---|
| Concentration of m-tolylene diamine in feed solution (o-dichlorobenzene)_____percent__ | 16 |
| Rate of addition of diamine_____lbs./hr__ | 3.3 |
| Temperature of diamine feed solution_____° C__ | 110 |
| Rate of addition of phosgene_____lbs./hr__ | 10 |
| Excess phosgene feed over theory_____percent__ | 85 |
| Rate of recycle feed through pump_____gals./min__ | 8 |
| Rate of o-dichlorobenzene feed to recycle___lbs./hr__ | 22 |
| Temperature in reaction zone_____° C__ | 155 |
| Pressure in reaction zone_____lbs./sq. in__ | 7 |
| Pressure in reservoir_____Atmospheric | |
| Time of run_____hours__ | 3 |
| Yield of 2,4-tolylene diiocyanate_____percent__ | 95 |

Using the same procedure as given in this example but with a pump that gave a recycle rate of 1 gallon per minute and a pressure in the reaction zone of 40 pounds per square inch with a temperature of 110° C., with no additional introduction of o-dichlorobenzene and using liquid phosgene, substantially the same yield of 2,4-tolylene diisocyanate was obtained.

*Example 7*

The equipment of Example 6 and the same procedure is used except that no o-dichlorobenzene is fed into the recycle stream since the concentration of m-tolylene diamine in o-dichlorobenzene fed is only 8%. In this experiment a lower operating temperature is used.

| | Quantity |
|---|---|
| Concentration of m-tolylene diamine in feed solution_____percent__ | 8 |
| Rate of addition of diamine_____lbs./hr__ | 3.3 |
| Temperature of diamine feed solution_____° C__ | 110 |
| Rate of phosgene feed_____lbs./hr__ | 10.8 |
| Recycle rate_____gals./min__ | 8 |
| Temperature in reaction zone_____° C__ | 90 |
| Pressure in reaction zone_____lb./sq. in__ | 6 |
| Time of run_____hours__ | 3 |
| Yield of 2,4-tolylene diisocyanate_____percent__ | 95.5 |

As indicated in the above examples, it is usually desired to preheat the amine solution to assure complete solution of the amine before it is injected into the solvent solution of the phosgene. As also illustrated in Example 6, the phosgene can be introduced in the liquid form as well as in the gaseous form since when viewed through a sight glass interposed in the line it appears to be completely soluble in the solvent under the pressures used.

The advantage of the present process resides in the fact that much smaller equipment is required for any given rate of production, and, as illustrated in certain of the examples, it is not necessary to use a large jacketed kettle where simple heat exchangers are employed. The process also has the advantage that the isocyanate is produced in a continuous manner and the time of reaction of the amine with the phosgene in solution in the solvent requires only a fraction of a second.

I claim:

1. In a continuous flow process of manufacturing organic isocyanates from organic primary amines and phosgene, the step which comprises passing an inert organic solvent solution of the amine into an inert organic solvent solution of phosgene under superatmospheric pressure and under conditions of turbulent flow while maintaining the temperature above that at which the carbamyl chloride of the particular amine employed is decomposed and within the range of from 90° C. to 180° C., the amount of phosgene employed being at least 1.25 mols per $NH_2$ group on the amine, the organic amine being one which contains no other group than —$NH_2$ which is reactive with phosgene.

2. A process of manufacturing organic isocyanates from organic primary amines and phosgene which comprises passing an inert organic solvent solution of the amine into an inert organic solvent solution of phosgene under superatmospheric pressure and under conditions of turbulent flow while maintaining the temperature above that at which the carbamyl chloride of the particular amine employed is decomposed and within the range of from 90° to 180° C., the molar ratio of the phosgene per —$NH_2$ group of the amine being at least 1.25:1, and immediately flashing the solution into a zone of lower pressure to liberate the hydrogen chloride and excess phosgene from the solvent solution of the isocyanate that is formed, the organic amine being one which contains no other group than —$NH_2$ which is reactive with phosgene.

3. A continuous process of manufacturing organic isocyanates from organic primary amines and phosgene which comprises passing an inert organic solvent solution of the amine into an inert organic solvent solution of phosgene under superatmospheric pressure and under conditions of turbulent flow while maintaining the temperature above that at which the carbamyl chloride of the particular amine employed is decomposed and within the range of from 90° to 180° C., the molar ratio of the phosgene per —$NH_2$ group of the amine being at least 1.25:1, and immediately flashing the solution into a zone of lower pressure to liberate the hydrogen chloride and excess phosgene from the solvent solution of the isocyanate that is formed, recycling the solvent solution of the isocyanate with the continuous addition of phosgene and further quantities of the inert solvent solution of the amine until the desired concentration of isocyanate in the solvent is obtained, and then continuously removing a portion of the isocyanate solvent solution from the system while adding a sufficient amount of solvent to maintain a constant volume in the system, the organic amine being one which contains no other group than —$NH_2$ which is reactive with phosgene.

4. A continuous process of manufacturing 2,4-tolylene diisocyanate from m-tolylene diamine and phosgene which comprises passing an inert organic solvent solution of the tolylene diamine into an inert organic solvent solution of phosgene under superatmospheric pressure and under conditions of turbulent flow in which the Reynolds number is at least 10,000 while maintaining the temperature above that at which the carbamyl chloride of the particular amine employed is decomposed and within the range of from 90° to 180° C., the amount of phosgene employed being at least 25% in excess of the stoichiometrical amount required for complete conversion of the diamine to the diisocyanate, and immediately thereafter flashing the solution into a zone of lower pressure to liberate the hydrogen chloride and excess phosgene from the solvent solution of the isocyanate.

5. A continuous process of manufacturing methylene bis(4-phenyl isocyanate) from methylene bis(4-phenylamine) and phosgene which comprises passing an inert organic solvent solution of the methylene bis(4-phenylamine) into an inert organic solvent solution of phosgene under superatmospheric pressure and under conditions of turbulent flow in which the Reynolds number is at least 10,000 while maintaining the temperature above that at which the carbamyl chloride of the particular amine employed is decomposed and within the range of from 90° to 180° C., the amount of phosgene employed being at least 25% in excess of the stoichiometrical amount required for complete conversion of the diamine to the diisocyanate, and immediately thereafter flashing the solution into a zone of lower pressure to liberate the hydrogen chloride and excess phosgene from the solvent solution of the isocyanate.

6. In a continuous flow process of manufacturing organic isocyanates from organic primary amines and phosgene, the step which comprises passing an inert organic solvent solution of the amine into an inert organic solvent solution of phosgene under superatmospheric pressure and under conditions of turbulent flow while maintaining the temperature above that at which the carbamyl chloride of the particular amine employed is decomposed and within the range of from 90° C. to 180° C., and immediately flashing the solution into a zone of lower pressure to liberate the hydrogen chloride and excess phosgene from the solvent solution of the organic isocyanate, the amount of phosgene employed being at least 1.25 mols per $NH_2$ group on the amine, the organic amine being one which contains no other group than —$NH_2$ which is reactive with phosgene.

7. In a continuous flow process of manufacturing organic isocyanates from organic primary amines and phosgene, the step which comprises passing an inert organic solvent solution of the amine into an inert organic solvent solution of phosgene under superatmospheric pressure and under conditions of turbulent flow in which the Reynolds number is at least 10,000, while maintaining the temperature above that at which the carbamyl chloride of the particular amine employed is decomposed and within the range of from 90° C. to 180° C., and immediately flashing the solution into a zone of lower pressure to liberate the hydrogen chloride and excess phosgene from the solvent solution of the organic isocyanate, the amount of phosgene employed being at least 1.25 mols per $NH_2$ group on the amine, the organic amine being one which contains no other group than —$NH_2$ which is reactive with phosgene.

8. A process of manufacturing organic isocyanates from organic primary amines and phosgene which comprises passing a 5% to 30% inert organic solvent solution of the amine into an inert organic solvent solution of phosgene under a pressure of from 5 to 200 lbs./sq. in. gauge and under conditions of turbulent flow in which the Reynolds number is at least 10,000, while maintaining the temperature above that at which the carbamyl chloride of the particular amine employed is decomposed and within the range of from 90° to 180° C., the molar ratio of the phosgene per —$NH_2$ group of the amine being at least 1.25:1, and immediately flashing the solution into a zone of approximately atmospheric pressure to liberate the hydrogen chloride and excess phosgene from the solvent solution of the isocyanate that is formed, the organic amine being one which contains no other group than —NH₂ which is reactive with phosgene.

9. A continuous process of manufacturing organic isocyanates from organic primary amines and phosgene which comprises passing a 5% to 30% inert organic solvent solution of the amine into an inert organic solvent solution of phosgene under a pressure of from 5 to 200 lbs./sq. in. gauge and under conditions of turbulent flow in which the Reynolds number is at least 10,000, while maintaining the temperature above that at which the carbamyl chloride of the particular amine employed is decomposed and within the range of from 90° to 180° C., the molar ratio of the phosgene per —NH₂ group of the amine being at least 1.25:1, and immediately flashing the solution into a zone of approximately atmospheric pressure to liberate the hydrogen chloride and excess phosgene from the solvent solution of the isocyanate that is formed, the organic amine being one which contains no other group than —NH₂ which is reactive with phosgene, recycling the solvent solution of the isocyanate with the continuous addition of phosgene and further quantities of the inert solvent solution of the amine until the desired concentration of isocyanate in the solvent is obtained, and then continuously removing a portion of the isocyanate solvent solution from the system while adding a sufficient amount of solvent to maintain a constant volume in the system.

10. A continuous process of manufacturing 2,4-tolylene diisocyanate from m-tolylene diamine and phosgene which comprises passing a 5% to 30% inert organic solvent solution of the tolylene diamine into an inert organic solvent solution of phosgene under superatmospheric pressure and under conditions of turbulent flow in which the Reynolds number is at least 10,000, while maintaining the temperature above that at which the carbamyl chloride of the particular amine employed is decomposed and within the range of from 90° to 180° C., the amount of phosgene employed being at least 25% in excess of the stoichiometrical amount required for complete conversion of the diamine to the diisocyanate, and immediately thereafter flashing the solution into a zone of approximately atmospheric pressure to liberate the hydrogen chloride and excess phosgene from the solvent solution of the isocyanate.

11. A continuous process of manufacturing methylene bis(4-phenyl isocyanate) from methylene bis(4-phenylamine) and phosgene which comprises passing a 5% to 30% inert organic solvent solution of the methylene bis-(4-phenylamine) into an inert organic solvent solution of phosgene under superatmospheric pressure and under conditions of turbulent flow in which the Reynolds number is at least 10,000, while maintaining the temperature above that at which the carbamyl chloride of the particular amine employed is decomposed and within the range of from 90° to 180° C., the amount of phosgene employed being at least 25% in excess of the stoichiometrical amount required for complete conversion of the diamine to the diisocyanate, and immediately thereafter flashing the solution into a zone of approximately atmospheric pressure to liberate the hydrogen chloride and excess phosgene from the solvent solution of the isocyanate.

References Cited in the file of this patent

UNITED STATES PATENTS

| | | |
|---|---|---|
| 2,641,449 | Morningstar et al. | June 16, 1953 |
| 2,643,264 | Fauser | June 23, 1953 |
| 2,683,160 | Irwin | July 6, 1954 |